US012025230B2

(12) United States Patent
Cognolato et al.

(10) Patent No.: US 12,025,230 B2
(45) Date of Patent: Jul. 2, 2024

(54) DYNAMIC INTERFERENCE SEALING DEVICE AND SYSTEM WITH IMPROVED CONTACT BEHAVIOUR

(71) Applicant: AKTIEBOLAGET SKF, Gothenburg (SE)

(72) Inventors: Gianni Alvise Cognolato, Moncalieri (IT); Claudio Foti, Villanova d'Asti (IT); Adriano Valsania, Riva presso Chieri (IT)

(73) Assignee: AKTIEBOLAGET SKF (SE)

(*) Notice: Subject to any disclaimer, the term of this patent is extended or adjusted under 35 U.S.C. 154(b) by 0 days.

(21) Appl. No.: 18/046,177

(22) Filed: Oct. 13, 2022

(65) Prior Publication Data
US 2023/0059779 A1 Feb. 23, 2023

Related U.S. Application Data

(63) Continuation of application No. 17/077,550, filed on Oct. 22, 2020, now Pat. No. 11,499,639.

(30) Foreign Application Priority Data

Oct. 31, 2019 (IT) .................. 102019000020112

(51) Int. Cl.
*F16J 15/3284* (2016.01)
*F16C 33/78* (2006.01)
(Continued)

(52) U.S. Cl.
CPC ....... *F16J 15/3284* (2013.01); *F16C 33/7823* (2013.01); *F16J 15/3232* (2013.01); *F16J 15/3264* (2013.01); *F16J 15/3256* (2013.01)

(58) Field of Classification Search
CPC .. F16J 15/3232; F16J 15/3256; F16J 15/3264; F16J 15/3284; F16C 33/7869;
(Continued)

(56) References Cited

U.S. PATENT DOCUMENTS 7,021,830 B2 * 4/2006 Takehara ................ B60B 37/00
384/486
9,464,720 B2 * 10/2016 Brunetti ............. F16C 33/7869
(Continued)

FOREIGN PATENT DOCUMENTS

JP 2005264999 9/2005
WO 2007108018 9/2007

OTHER PUBLICATIONS

Search Report for corresponding Italy application No. 102019000020112 dated Jul. 6, 2020.
U.S. Appl. No. 17/077,550.

*Primary Examiner* — Nicholas L Foster
(74) *Attorney, Agent, or Firm* — Reed Smith LLP (57) ABSTRACT

A sealing system including an annular support, an annular sealing element and an annular shielding element; a first and a second lip of the sealing element interact slidingly with an abutment surface of the shielding element and each include: a root portion which extends perpendicularly in cantilever fashion from a flange portion of the annular support; a flexing portion, which extends in cantilever fashion from the root portion in an oblique direction with a thinner radial thickness, delimited by an annular internal surface facing the abutment surface and by an annular external surface facing towards the support, consisting of surfaces of revolution generated by segments of circumference; and a contact portion including a wedge-shaped overhang and a step portion flanking the overhang, which forms with the abutment surface a first and a second angle ($\alpha$, $\beta$), the first angle facing the annular support and being smaller than the second angle.

10 Claims, 3 Drawing Sheets

(51) Int. Cl.
*F16J 15/3232* (2016.01)
*F16J 15/3264* (2016.01)
*F16J 15/3256* (2016.01)

(58) Field of Classification Search
CPC .............. F16C 33/7823; F16C 33/7879; F16C 33/7883
See application file for complete search history.

(56) References Cited

U.S. PATENT DOCUMENTS

| | | | |
|---|---|---|---|
| 9,534,636 B2* | 1/2017 | Takayama | F16J 15/3264 |
| 10,544,865 B2* | 1/2020 | Sakano | F16J 15/3456 |
| 11,499,639 B2* | 11/2022 | Cognolato | F16C 33/7826 |
| 2005/0089254 A1* | 4/2005 | Takehara | B60B 27/00 384/484 |
| 2007/0201782 A1* | 8/2007 | Miyagawa | F16C 33/7879 277/351 |
| 2009/0108539 A1* | 4/2009 | Forti | F16C 41/007 277/553 |
| 2011/0233874 A1* | 9/2011 | Foti | F16C 41/007 277/562 |
| 2013/0285333 A1* | 10/2013 | Foti | D06F 37/00 277/562 |
| 2015/0117805 A1* | 4/2015 | Takayama | F16C 33/7883 384/480 |
| 2016/0039246 A1* | 2/2016 | Brunetti | F16C 33/7823 277/551 |
| 2018/0066757 A1* | 3/2018 | Sakano | F16J 15/164 |
| 2018/0147886 A1* | 5/2018 | Morello | F16J 15/3268 |
| 2021/0131563 A1* | 5/2021 | Cognolato | F16J 15/3264 |

\* cited by examiner

DYNAMIC INTERFERENCE SEALING DEVICE AND SYSTEM WITH IMPROVED CONTACT BEHAVIOUR

CROSS REFERENCE RELATED APPLICATION

This application is a continuation of, and claims the benefit under 35 U.S.C. § 120 of the earlier filing date of, copending U.S. Ser. No. 17/077,550 filed on Oct. 22, 2020, which is based on and claims priority under 35 U.S.C. § 119 to Italian Application No. 102019000020112, filed Oct. 31, 2019, under 35 U.S.C. § 119, the entire contents of which are incorporated herein by reference.

FIELD

The present disclosure relates to a dynamic interference sealing device and system with improved contact behaviour, which may be applied, for example, to or in the presence of a rolling bearing or to a driving shaft, and is in each case inserted or insertable between a first and a second mechanical member in relative rotation, for protecting an internal cavity delimited by the mechanical members, and/or a rolling bearing or its rolling bodies, from external contaminants, while also retaining any lubricant inside.

BACKGROUND

As is known, especially where high-stress applications are concerned, for example in driving shafts or power take-offs of agricultural machines or industrial vehicles, but also in ordinary vehicles, modern industry requires sealing devices or systems having high sealing capacity, usually to be obtained by using one or more elastically deformable annular lips that interact slidingly, with a relatively high degree of interference, with an abutment surface which is, for example, formed directly on one of the members in relative rotation or, more commonly, on an annular shielding element that is mounted in a position facing the sealing device, thus providing a complex sealing system.

The sealing device is usually composed of a substantially rigid annular support and an annular sealing element, provided with one or more elastically deformable sealing lips, the sealing element being carried integrally by the annular support.

Usually, the sealing element is formed integrally in one piece with the annular support by co-moulding and/or bonding, carried out for example during vulcanization, by known techniques.

BRIEF DESCRIPTION OF THE DRAWINGS

The embodiments in accordance with this disclosure will now be described with reference to the appended drawings, which show some non-limiting examples of embodiment of the disclosure, in which.

DETAILED DESCRIPTION

Although the use of a relatively high designed degree of interference between the sealing lips and the corresponding abutment surface provides the desired sealing action, it also produces an undesired deformation of the sealing lips, which are "flattened" against the abutment surface with which they form, instead of a substantially linear contact which would consequently exert a high contact pressure, a flat contact surface which therefore reduces the contact pressure, and consequently reduces the sealing action for a given degree of interference and increases the friction, leading to higher energy consumption and greater wear on the sealing lips.

According to embodiments of this disclosure, a sealing device and system are provided which are free of the drawbacks of the prior art, while being reliable and economical, and which in particular make it possible to improve the sealing performance in terms of contact pressure and contact force over a wider range of designed interference.

According to embodiments of this disclosure, therefore, a sealing device insertable between a first and a second mechanical member in relative rotation, for example, but not exclusively, between the rings of a rolling bearing, is provided, together with an associated sealing system, the device and system having the characteristics stated in the appended claims.

Figure 1:
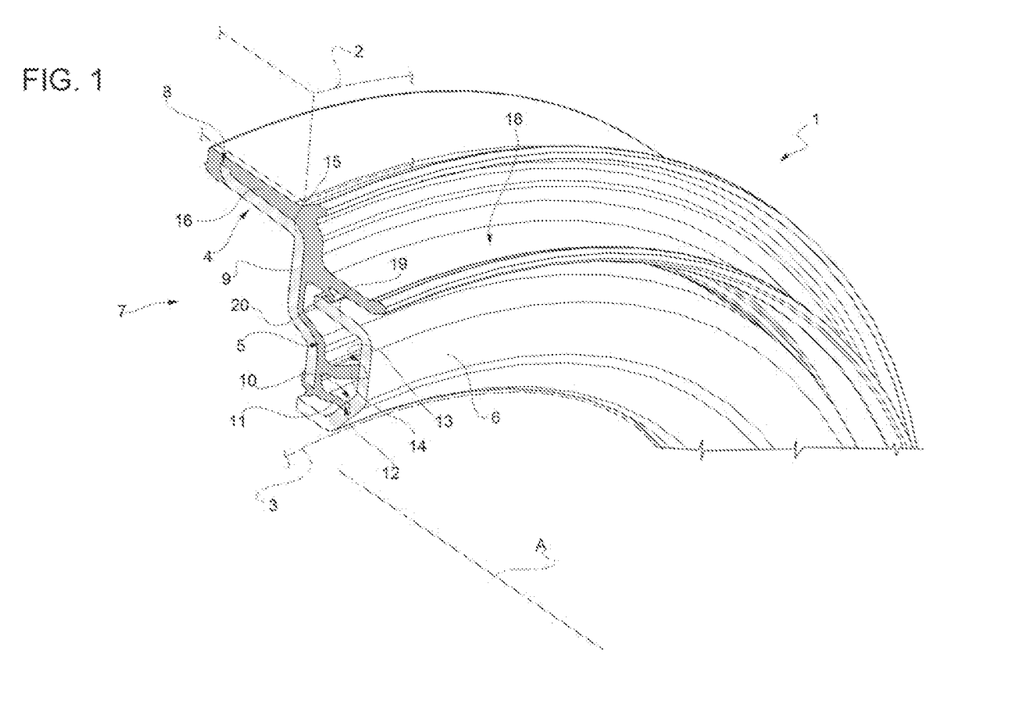
FIG. 1 shows schematically a partial view in three-quarter front perspective and in radial section of a sealing system made in accordance with this disclosure.

With reference to FIG. 1, as indicated by the number 1, the whole of a complex sealing system insertable between a first 2 and a second 3 relatively rotatable mechanical member is shown, these members being known and schematically illustrated only partially and in broken lines.

The sealing system 1 comprises a substantially rigid annular support 4, an elastomeric annular sealing element 5 and a substantially rigid shielding annular element 6 that can be coupled coaxially to the annular support 4.

The annular support 4 and the annular sealing element 5 form, in combination, a sealing device 7 which, when coupled to the shielding element 6, forms the sealing system 1.

In the non-limiting example illustrated, the annular support 4 comprises a sleeve portion 8, configured to be fixed in an angularly integral way to the first member 2, and a flange portion 9, which extends radially in cantilever fashion from the sleeve portion 8 and which carries integrally in one piece the annular sealing element 5.

On the other hand, the annular shielding element 6 is configured to be fixed in an angularly integral way to the second member 3, which consists of a shaft in the illustrated non-limiting example, and is provided, towards the annular support 4, with an abutment surface 10 for the annular sealing element 5.

For its part, the annular sealing element 5 is provided with at least one elastically deformable annular sealing lip 11 configured to interact slidingly and with interference with the abutment surface 10 in order to form a dynamic seal with the latter.

Figure 2:
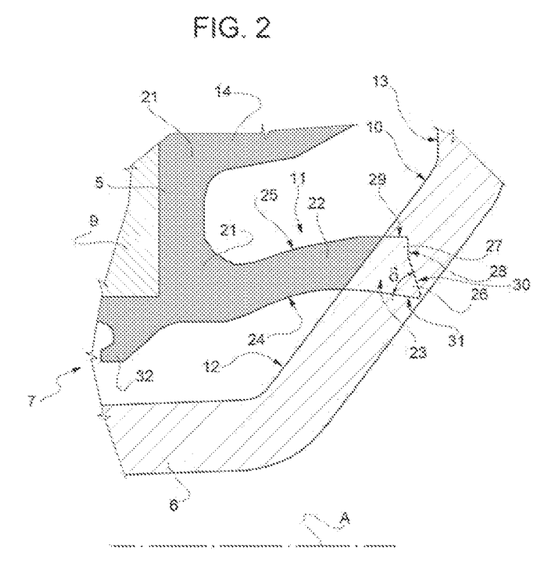
FIG. 2 shows schematically, on an enlarged scale, a view in elevation and in radial section of a detail of FIG. 1 which represents a first embodiment of the sealing device.

In the non-limiting, but preferred, example of embodiment illustrated, the abutment surface 10 comprises, as is more readily visible in FIG. 2 owing to the enlarged scale, a first annular portion 12 defined by a truncated conical surface having a conicity (that is to say a theoretical vertex, that is to say a geometrical point of origin of the surface) directed towards the annular support 4, and a second annular portion 13 defined by a flat front surface of the annular shielding element 6 facing towards and parallel to the flange portion 9 of the annular support 4.

The annular sealing element 5 also comprises a first lip, consisting of the lip 11 described above, and a second, elastically deformable, annular sealing lip 14.

The first annular lip 11 is configured to interact with the first annular surface portion 12, which is conical (or at least inclined/oblique, or "non-linear" in the technical language), of the abutment surface 10, while the second annular lip 14 is configured to interact with the second annular surface portion 13 of the abutment surface 10, this portion of the surface 13 being a flat surface perpendicular to an axis of symmetry A of the sealing system 1 as a whole and of the annular support 4 and of the annular sealing element 5 and shielding element 6.

According to an aspect of embodiments in accordance with this disclosure, the annular support 4 comprises (FIG. 1) a first annular metal element delimiting radially, on the inside, the sleeve portion 8 and the flange portion 9, the latter being shaped in the form of a chair in radial section and towards the annular shielding element 6. In some embodiments the first annular metal element is formed by stamping such that the first annular metal element is said to be "coined". One will appreciate upon reading this disclosure in its entirety that the first annular metal element may be formed by other suitable means.

The annular support 4 further comprises (FIG. 1) a second annular element 16 made of a synthetic plastic material co-moulded radially on to the outside of the annular metal element 15 so as to define with the latter the sleeve portion 8.

The annular element 16 of synthetic plastic material is also provided, on the side facing the annular shielding element 6, with a substantially cylindrical overhang 18 which radially surrounds the outside of the annular shielding element 6, with which it is coaxial.

The shielding element 6, in the preferred embodiment, is shaped in radial section substantially as a reversed C facing the annular support 4, in such a way that a sleeve portions 19 of the element, radially external to the abutment surface 10, is inserted coaxially inside the substantially cylindrical overhang 18 of the second annular element 16 made of synthetic plastic material.

The overhang 18 is preferably provided, integrally in one piece, towards the annular shielding element 6, with an annular lip-shaped winglet 20, which extends radially towards the sleeve portion 19 of the annular shielding element 6 and which is configured to form a labyrinth seal with the latter.

According to a first aspect of the embodiments in accordance with this disclosure, both the first and the second annular lips 11 and 14 each comprise, in combination, a root portion 21 immediately adjacent to the flange portion 9, a flexing portion 22 which extends immediately in cantilever fashion from the root portion 21 in an oblique, that is to say inclined, direction relative to the flange portion 9 and is directed in such a way that the flexing portion 22 extends at least partially towards the sleeve portion 8 of the annular support 4, and a contact portion 23 which extends immediately in cantilever fashion from the flexing portion 22 in a direction parallel to the root portion 21.

Figure 3:
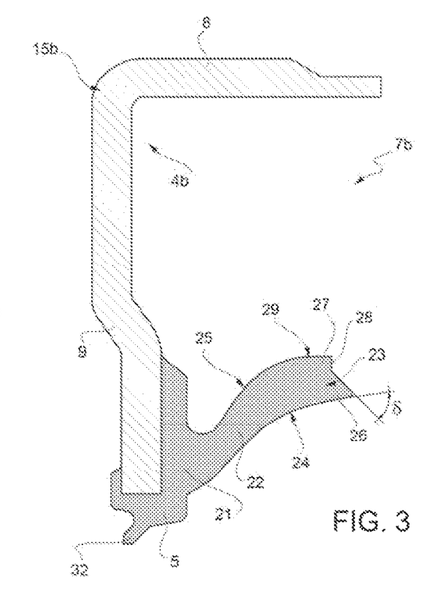
FIG. 3 shows schematically, on an enlarged scale, a view in elevation and in radial section of a second embodiment of the sealing device, also applied to the sealing system of FIG. 1.
Figure 4:
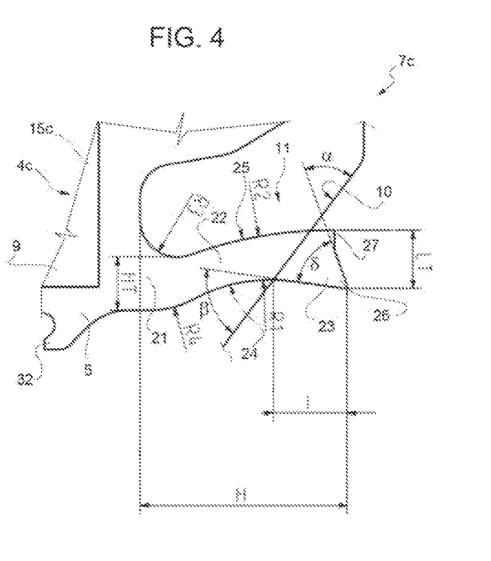
FIGS. 4 and 5 show schematically the same view in elevation and in radial section of the same detail of two preferred embodiments of the sealing device in accordance with this disclosure, which are both applied to the sealing system of FIG. 1.
Figure 5:
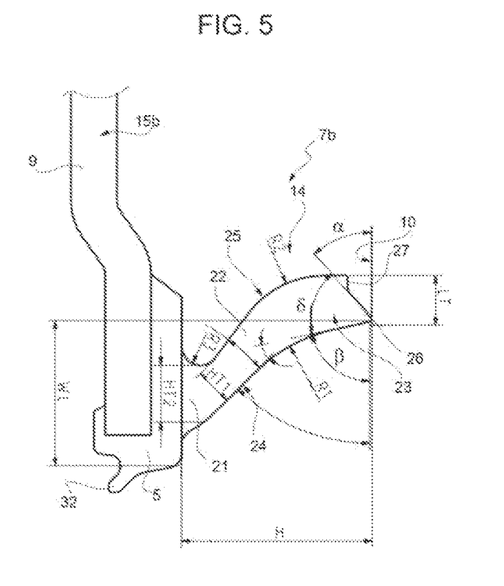

The description given from this point onward concerning the lips 11 and 14 of the sealing device 7 belonging to the sealing system 1 is equally applicable to the embodiments of this disclosure illustrated in FIGS. 3, 4 and 5, which relate to two different embodiments of the sealing device only, indicated by 7b in FIGS. 3 and 5 and 7c in FIG. 4 respectively. Other details that are similar or identical to those described previously or to be described below with reference to the sealing system 1 are indicated, for simplicity, by the same reference numerals.

The root portion 21 extends perpendicularly in cantilever fashion from the flange portion 9, and has, in a direction perpendicular to the sleeve portion 8, a first predetermined radial thickness HT (FIG. 4); this is true of not only the sealing device 7 but also the sealing device 7c illustrated in FIG. 4, which has only one sealing lip 11, as well as the sealing device 7b of FIGS. 3 and 5, which has only one sealing lip 14. As illustrated in FIG. 4, root portion 21 has a radius of curvature R3 of an annular external concave surface and a radius of curvature R4 of an annular internal convex surface. The flexing portion 22 begins immediately thereafter with an increasing slope at a point where a slope of an external annular surface of the first elastically deformable annular lip 11 begins to increase.

The flexing portion 22 has a radial thickness thinner than that of the root portion 21 and is delimited by an annular internal surface 24 facing the abutment surface 10 and by an annular external surface 25 facing the sleeve portion 8, both formed by surfaces of revolution generated by a segment of a circumference.

The contact portion 23 is configured to interact in contact with the abutment surface 10 and, according to an aspect of embodiments in accordance with this disclosure, comprises (FIG. 2-5) a first annular portion 26 shaped as an overhang having a wedge shape in radial section and projecting towards the abutment surface 10, and a second annular portion 27, immediately flanking the first annular portion 26 on the side facing the sleeve portion 8 of the annular support 4, so as to form a thickening of the contact portion 23 on the side facing the sleeve portion 8.

According to one aspect of embodiments in accordance with this disclosure, the second annular portion 27 is step-shaped and is delimited (FIGS. 2 and 3) by a first annular surface 28 and a second annular surface 29 adjacent and substantially perpendicular to one another, both facing in the opposite direction from the flange portion 9; in particular, the surface 28 faces axially towards the abutment surface 10 and the surface 29 faces radially outwards.

Additionally, the wedge-shaped portion or overhang 26 has a free end that is formed by a vertex of the wedge at an acute angle δ (FIGS. 2 and 3), and that forms (FIGS. 4 and 5) with the abutment surface 10, when the lips 11, 14 are in a non-deformed condition, a first and a second angle α and β, complementary to the acute angle δ formed by the vertex of the wedge 2.

According to one aspect of embodiments in accordance with this disclosure, the first angle α is formed on the side facing the sleeve portion 8 and is always smaller than the second angle β, which is formed on the side opposite the first angle α.

Additionally, according to another aspect embodiments in accordance with this disclosure, in the sealing device 7 with two lips, as well as in the sealing device 7c with only one lip, the contact portion 23 of the lip 11 has, in a direction perpendicular to the sleeve portion 8, a second predetermined radial thickness LT (FIG. 4) greater than the first predetermined radial thickness HT of the root portion 21.

Similarly, in the sealing device 7 with two lips, as well as in the sealing device 7b with only one lip, the contact portion 23 of the lip 14 has, in a direction perpendicular to the sleeve portion 8, a second predetermined radial thickness IT, which is smaller than the first predetermined radial thickness of the root portion 21 (which is indicated by HT1 in FIG. 5) but still greater than the radial thickness of the flexing portion 22.

Finally, according to another aspect of the embodiments in accordance with this disclosure, the annular external surface 25 of the lip 11 in both embodiments 7 and 7c of the sealing device of the embodiments in accordance with this disclosure has a radius of curvature R2 greater than the radius of curvature R1 of the annular internal surface 24 of the same lip 11.

However, the annular external surface 25 of the lip 14 in both embodiments 7 and 7b of the sealing device of embodiments in accordance with this disclosure has a radius of curvature R2 smaller than that (R1) of the annular internal surface 24 of the same lip 14.

In both of the embodiments 7 and 7c, additionally, the contact portion 23 of the lip 11 is delimited radially towards the inside and the outside by respective opposite conical surfaces 30, 31 (FIG. 2) diverging from one another on the opposite side from the abutment surface 10.

In the embodiments 7 and 7c, the acute angle δ of the wedge-shaped annular overhang 26 of the lip 11 and the angles α and β complementary to it, formed by the overhang 26 of the lip 11 of the sealing device 7 with the conical annular portion 12 of the abutment surface 10, or, in the case of the sealing device 7c, directly with the abutment surface 10, which in this case is conical (FIG. 4), are between 58° and 66°, between 50° and 60°, and between 53° and 67°, respectively.

In the embodiments 7 and 7b, the acute angle δ of the wedge-shaped annular overhang 26 of the lip 14 and the angles α and β complementary to it, formed by the overhang 26 of the lip 14 of the sealing device 7 with the flat annular portion 13 of the abutment surface 10, or, in the case of the sealing device 7b, directly with the abutment surface 10, which in this case is flat (FIG. 5), are between 40° and 55° (alpha), between 70° and 80° (beta), and between 50° and 60° (delta), respectively.

Additionally, the contact portion 23 of the lip 14, in both of the embodiments 7 and 7b, is delimited radially on the side opposite the sleeve portion 8 by a continuous extension of the internal surface 24 of the flexing portion 22.

On the basis of the above description, it is evident that the embodiments in accordance with this disclosure relate both to the complex sealing system 1 of the package type, illustrated in FIGS. 1 and 2, and to a simple sealing device 7, 7b or 7c having two lips 11, 14 as in the device 7, or having a single lip 11 (device 7c) or 14 (device 7b), that can be coupled either to a shielding element 6 such as that illustrated (or one modified so as to have as its whole abutment surface 10 a conical surface such as 12 in the application case of the device 7c, or a flat surface such as 13 in the application case of the device 7b), or directly to an abutment surface 10 which is simple (solely conical or flat) or hybrid (with a conical surface portion and a flat surface portion), being formed directly on the mechanical member 3 for example.

In this last-mentioned case, the sealing device 7, 7b or 7c will be directly insertable between the first and the second relatively rotatable mechanical members 2, 3.

In the non-limiting embodiments illustrated, the sealing devices 7b and 7c differ from the sealing device 7 described above with reference to the sealing system 1, firstly in that they comprise only one of the two axial lips 11, 14. However, these lips, like the rest of the sealing device 7, may comprise other sealing lips, whether sliding or non-sliding, for example a radial lip 32, capable of forming a labyrinth seal of a known type.

Additionally, the sealing devices 7b and 7c differ from the sealing device 7 in that they each comprise an identical substantially rigid annular support 4b or 4c, respectively, illustrated as a whole in FIG. 3 only (support 7b), formed solely by a coined annular metal element 15b or 15c, respectively, but still comprising a sleeve portion 8, configured to be coupled in an angularly integral way to the first mechanical member 2, and a flange portion 9, which extends perpendicularly in cantilever fashion from the sleeve portion 8 and carries integrally an annular sealing element 5, from which at least one elastically deformable annular lip 11 or 14, or two lips 11, 14, project in cantilever fashion, as described above.

If necessary, in the case of the devices 7b and 7c, the shape of the annular metal element 15b or 15c may be different from that of the annular metal element 15 of FIG. 1; for example, the sleeve portion 8 projects from the flange portion 9 toward the abutment surface 10, while in the case of the device 7 the sleeve portion 8 projects from the flange 9 in the opposite direction, the cylindrical overhang 18 being present.

In other respects the sealing devices 7b and 7c are identical to the sealing device 7 described previously, and details similar or identical to those described previously are indicated with the same numbers. For the devices 7b and 7c, therefore, reference should be made to the preceding description provided for the device 7.

A difference between the sealing devices 7b and 7c is that, in the device 7b the contact portion 23 has, in a direction perpendicular to the sleeve portion 8, a predetermined radial thickness which is smaller than the first predetermined radial thickness of the root portion 21, while in the sealing device 7c the contact portion 23 has, in a direction perpendicular to the sleeve portion 8, a predetermined radial thickness which is greater than the predetermined radial thickness of the root portion 21.

A further difference is that, in the sealing device 7b, the annular external surface 25 has a radius which is greater than that of the internal surface 24, and this characteristic is obtained in combination with the fact that the contact portion 23 has, in a direction perpendicular to the sleeve portion 8, a predetermined radial thickness which is smaller than the predetermined radial thickness of the root portion 21.

On the other hand, in the sealing device 7c the annular external surface 25 has a radius which is smaller than that of the internal surface 24, and this characteristic is obtained in combination with the fact that the contact portion 23 has, in a direction perpendicular to the sleeve portion 8, a predetermined radial thickness which is greater than the predetermined radial thickness of the root portion 21.

Additionally, in the sealing device 7b, the wedge-shaped overhang 26 of the contact portion 23 forms, towards the abutment surface, an acute angle of between 50° and 70°, and preferably between 50° and 60°, while, in the sealing device 7c, the wedge-shaped overhang 26 of the contact portion 23 forms, towards the abutment surface, an acute angle which is again between 50° and 70°, and preferably between 58° and 66°.

In all cases, the newly designed axial lip 11 and/or 14 as described may operate on non-rectilinear surfaces, for example surfaces that are curved, or simply inclined or oblique, in more extreme interference conditions than those of the currently known solutions. This is made possible by the shape of the lip 11/14, for the following reasons:

1—In the contact area, the angle between the operating counter-face 10 and the lip 11/14 is increased, an area with convex curvature also being created. These two characteristics allow a more uniform distribution of the pressures and delay the effect of the "flattening" of the contact surface of the lip against the abutment surface 10. The curved geometry of the lip 11/14 is better able to oppose the deformations undergone by the lip in operation, thus creating more stable conditions.

2—In the flexing area 22 located in the lower part of the lip 11/14 opposed to the contact area 23, material is added to compensate for the removal that takes place in the contact area 23. Thus the peak pressures remain at optimal values for a wide range of interference tolerances.

The proposed solution therefore improves the following factors:

1—It increases the stability of the contact pressures with a higher interference interval.

2—It delays the effect of the "flattening" of the contact surface of the lip, thus increasing the range of interference.

3—It creates a more constant contact force effect, while remaining within the limits of acceptability of the forces.

In addition to the exemplary embodiments, as described above, it is to be understood that numerous further variants exist. It must also be understood that said embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A sealing device insertable between a first mechanical member and a second mechanical member, wherein the first and second mechanical members are relatively rotatable to one another, the sealing device comprising:
   a substantially rigid annular support; and
   a sealing annular element made of an elastomeric material integral with the annular support,
   wherein the annular support comprises:
      a sleeve portion configured to angularly couple integral with the first mechanical member; and
      a flange portion that extends perpendicularly in a cantilever fashion from the sleeve portion and that integrally carries the sealing annular element, from which a first elastically deformable annular lip protrudes in a cantilever fashion, the first elastically deformable annular lip is configured such that when in use the first elastically deformable annular lip cooperates with interference against an annular abutment surface integral with the second mechanical member so as to achieve a dynamic sliding seal, wherein when in use the first annular lip is further configured such that the first annular lip extends in a cantilever fashion from the flange portion from a first side facing the abutment surface and in a direction substantially perpendicular to the flange portion, so as to be coaxial with the sleeve portion; the first annular lip comprising:
      i) a root portion immediately adjacent to the flange portion, from which the root portion extends perpendicularly in a cantilever fashion, the root portion comprising, in a direction perpendicular to the sleeve portion, a first pre-set radial thickness;
      ii) a flexing portion, that immediately extends in a cantilever fashion from the root portion in a direction oblique with respect to the flange portion and directed towards the sleeve portion, the flexing portion comprising a radial thickness thinner than that of the root portion and is delimited by an internal annular surface configured for facing the abutment surface and by an external annular surface facing the sleeve portion;
      iii) a contact portion immediately extending in a cantilever fashion from the flexing portion in a direction parallel to the root portion and is configured to cooperate in contact with the abutment surface, the contact portion comprising a first annular portion comprising a wedge-shape in radial section, which forms an overhang of the contact portion configured for protruding towards the abutment surface, and a second annular portion, immediately flanking the first annular portion from the side of the sleeve portion of the support, so as to form a thickening of the contact portion on the side of the sleeve portion; and
      iv) the second annular portion being step-shaped and being delimited by a first and by a second annular surface adjacent and perpendicular to one another and both substantially on a side opposite to the flange portion;
   wherein the contact portion has, in a direction perpendicular to the sleeve portion, a second pre-set radial thickness greater than the radial thickness of the flexing portion and less than the first pre-set radial thickness of the root portion;
   wherein the root portion comprises an external annular curved surface comprising a decreasing slope decreasing from the flange portion, and the flexing portion begins immediately thereafter at a point where a slope of an external annular surface of the first annular lip begins to increase, wherein the first pre-set radial thickness of the root portion is measured at a minimum radial thickness of the root portion.

2. The sealing device of claim 1, wherein said external and internal annular surfaces comprises surfaces of revolution generated by a circumference segment, the external annular surface comprising a radius smaller than that of the internal surface.

3. The sealing device of claim 1, wherein said wedge-shaped overhang of the contact portion forms, towards the abutment surface, an acute angle, comprised between 50° and 70°.

4. The sealing device of claim 1, wherein said wedge-shaped overhang forms with the abutment surface, when the first lip is in non-deformed conditions, a first angle and a second angle, complementary to an acute angle formed by the overhang towards the abutment surface; the first angle being formed on the side of the sleeve portion and being smaller than the second angle, which is formed on the side opposite to the first angle.

5. A sealing device insertable between a first mechanical member and a second mechanical member, wherein the first and second mechanical members are relatively rotatable to one another, the sealing device comprising:
a substantially rigid annular support; and
a sealing annular element made of an elastomeric material integral with the annular support,
wherein the annular support comprises:
a sleeve portion configured to angularly couple integral with the first mechanical member; and
a flange portion that extends perpendicularly in a cantilever fashion from the sleeve portion and that integrally carries the sealing annular element, from which a first elastically deformable annular lip protrudes in a cantilever fashion, the first elastically deformable annular lip is configured such that when in use the first elastically deformable annular lip cooperates with interference against an annular abutment surface integral with the second mechanical member so as to achieve a dynamic sliding seal, wherein when in use the first annular lip is further configured such that the first annular lip extends in a cantilever fashion from the flange portion from a first side facing the abutment surface and in a direction substantially perpendicular to the flange portion, so as to be coaxial with the sleeve portion; the first annular lip comprising:
i) a root portion immediately adjacent to the flange portion, from which the root portion extends perpendicularly in a cantilever fashion, the root portion comprising, in a direction perpendicular to the sleeve portion, a first pre-set radial thickness;
ii) a flexing portion, that immediately extends in a cantilever fashion from the root portion in a direction oblique with respect to the flange portion and directed towards the sleeve portion, the flexing portion comprising a radial thickness thinner than that of the root portion and is delimited by an internal annular surface configured for facing the abutment surface and by an external annular surface facing the sleeve portion;
iii) a contact portion immediately extending in a cantilever fashion from the flexing portion in a direction parallel to the root portion and is configured to cooperate in contact with the abutment surface, the contact portion comprising a first annular portion comprising a wedge-shape in radial section, which forms an overhang of the contact portion configured for protruding towards the abutment surface, and a second annular portion, immediately flanking the first annular portion from the side of the sleeve portion of the support, so as to form a thickening of the contact portion on the side of the sleeve portion; and
iv) the second annular portion being step-shaped and being delimited by a first and by a second annular surface adjacent and perpendicular to one another and both substantially on a side opposite to the flange portion;
wherein said external and internal annular surfaces comprise surfaces of revolution generated by a circumference segment, the external annular surface comprising a radius less than a radius of the internal surface measured in an axial cross-section of the sealing device when the lip is in a non-deformed condition; and wherein the external annular surface is convex and the internal annular surface is concave.

6. The sealing device of claim 5, wherein said wedge-shaped overhang of the contact portion forms, towards the abutment surface, an acute angle, comprised between 50° and 70°.

7. The sealing device according to claim 5, wherein said wedge-shaped overhang forms with the abutment surface, when the first lip is in non-deformed conditions, a first angle and a second angle, complementary to an acute angle formed by the overhang towards the abutment surface; the first angle being formed on the side of the sleeve portion and being smaller than the second angle, which is formed on the side opposite to the first angle.

8. A sealing device insertable between a first mechanical member and a second mechanical member, wherein the first and second mechanical members are relatively rotatable to one another, the sealing device comprising:
a substantially rigid annular support; and
a sealing annular element made of an elastomeric material integral with the annular support,
wherein the annular support comprises:
a sleeve portion configured to angularly couple integral with the first mechanical member; and
a flange portion that extends perpendicularly in a cantilever fashion from the sleeve portion and that integrally carries the sealing annular element, from which a first elastically deformable annular lip protrudes in a cantilever fashion, the first elastically deformable annular lip is configured such that when in use the first elastically deformable annular lip cooperates with interference against an annular abutment surface integral with the second mechanical member so as to achieve a dynamic sliding seal, wherein when in use the first annular lip is further configured such that the first annular lip extends in a cantilever fashion from the flange portion from a first side facing the abutment surface and in a direction substantially perpendicular to the flange portion, so as to be coaxial with the sleeve portion; the first annular lip comprising:
i) a root portion immediately adjacent to the flange portion, from which the root portion extends perpendicularly in a cantilever fashion, the root portion comprising, in a direction perpendicular to the sleeve portion, a first pre-set radial thickness;
ii) a flexing portion, that immediately extends in a cantilever fashion from the root portion in a direction oblique with respect to the flange portion and directed towards the sleeve portion, the flexing portion comprising a radial thickness thinner than that of the root portion and is delimited by an internal annular surface configured for facing the abutment surface and by an external annular surface facing the sleeve portion;
iii) a contact portion immediately extending in a cantilever fashion from the flexing portion in a direction parallel to the root portion and is configured to cooperate in contact with the abutment surface, the contact portion comprising a first annular portion comprising a wedge-shape in radial section, which forms an overhang of the contact portion configured for protruding towards the abutment surface, and a second annular portion, immediately flanking the first annular portion from the side of the sleeve portion of the support, so as to form a thickening of the contact portion on the side of the sleeve portion; and iv) the second annular portion being step-shaped and being delimited by a first and by a second annular surface adjacent and perpendicular to one another and both substantially on a side opposite to the flange portion;

wherein said external and internal annular surfaces comprise surfaces of revolution generated by a circumference segment, the external annular surface comprising a radius greater than a radius of the internal surface measured in a radial plane of the sealing device when the lip is in a non-deformed condition.

9. The sealing device of claim 8, wherein said wedge-shaped overhang of the contact portion forms, towards the abutment surface, an acute angle, comprised between 50° and 70°.

10. The sealing device of claim 8, wherein said wedge-shaped overhang forms with the abutment surface, when the first lip is in non-deformed conditions, a first angle and a second angle, complementary to an acute angle formed by the overhang towards the abutment surface; the first angle being formed on the side of the sleeve portion and being smaller than the second angle, which is formed on the side opposite to the first angle.

* * * * *